US009495189B2

United States Patent
Shu et al.

(10) Patent No.: US 9,495,189 B2
(45) Date of Patent: Nov. 15, 2016

(54) LIVE REPLICATION OF A VIRTUAL MACHINE EXPORTED AND IMPORTED VIA A PORTABLE STORAGE DEVICE

(71) Applicant: VMware, Inc., Palo Alto, CA (US)

(72) Inventors: Longhao Shu, Sunnyvale, CA (US); Min Cai, Sunnyvale, CA (US); Gabriel Tarasuk-Levin, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 14/586,944

(22) Filed: Dec. 30, 2014

(65) Prior Publication Data

US 2016/0188353 A1 Jun. 30, 2016

(51) Int. Cl.
*G06F 9/455* (2006.01)

(52) U.S. Cl.
CPC ................. *G06F 9/45533* (2013.01)

(58) Field of Classification Search
CPC ............ G06F 9/45533; G06F 9/5077; G06F 9/45537
USPC .......................................................... 718/1
See application file for complete search history.

(56) References Cited

U.S. PATENT DOCUMENTS

| 7,484,208 | B1 * | 1/2009 | Nelson ................ G06F 9/45558 711/6 |
| 8,135,930 | B1 | 3/2012 | Mattox et al. |
| 2011/0276963 | A1 | 11/2011 | Wu et al. |
| 2012/0066677 | A1 * | 3/2012 | Tang ..................... G06F 9/4856 718/1 |
| 2012/0233610 | A1 * | 9/2012 | Mandre ............... G06F 9/45558 718/1 |
| 2013/0125122 | A1 | 5/2013 | Hansen |
| 2014/0351813 | A1 * | 11/2014 | Mandre ............... G06F 9/45558 718/1 |
| 2015/0227386 | A1 * | 8/2015 | Fitzgerald ........... G06F 9/45537 718/1 |
| 2015/0347165 | A1 * | 12/2015 | Lipchuk .............. G06F 9/45533 718/1 |

OTHER PUBLICATIONS

Liu et al., Live Virtual Machine Migration via Asynchronous Replication and State Synchronization, Mar. 10, 2011, IEEE, pp. 1986-1999.*
"AWS Import/Export," Cloud Data Transfer & Migration Services, downloaded from http://aws.amazon.com/importexport/ on Oct. 28, 2014, (9 pages).
"How to Seed a VCloud Air—Disaster Recovery Replication Without Downtime," Chris Colotti's Blog, downloaded from http://www.chriscolotti.us/vmware/hybrid-cloud-vmware/how-to-seed-a-vcloud-hybrid-service-disaster-recovery-replication-without-downtime/, updated Jul. 8, 2014 (2 pages).

(Continued)

*Primary Examiner* — John Chavis

(57) ABSTRACT

Exemplary methods, apparatuses, and systems receive a request to initiate replication of a virtual machine (VM). In response to the request, a copy of the VM disk is exported to a locally attached portable storage device while the VM continues running. In response to receiving indication of the VM disk being imported from the portable storage device locally within a destination data center, the host computer determines VM data within the source data center is different from or not included within the exported copy of the VM disk and transmits the VM data to the destination data center via a network connection while the VM continues running. An indication that the virtual machine data within the destination data center is within a threshold of similarity with virtual machine data within the source data center is transmitted to the destination data center via the network connection.

20 Claims, 4 Drawing Sheets

(56) References Cited

OTHER PUBLICATIONS

"Replicate Virtual Machines by Using Replication Seeds," downloaded from https://pubs.vmware.com/srm-51/topic/com.vmware.srm.admin.doc/GUID-D6CA3064-93E1-4283-A274-5509D3724A1B.html on Oct. 28, 2014 (3 pages).

"Replicating Virtual Machines Using Replication Seeds," downloaded from https://pubs.vmware.com/vsphere-51/index.jsp?topic=%2Fcom.vmware.vsphere.replication_admin.doc%2FGUID-C7CD1006-7E2F-42B3-A3EC-429F365140E1.html on Oct. 28, 2014 (1 page).

"Offline Data Transfer to VMWare vCloud Hybrid Service," vCloud Connector 2.5.0 downloaded from http://pubs.vmware.com/hybridcloud-25/topic/com.vmware.ICbase/PDF/vCloudConnector_25_0fflineDataTransfer.pdf, Copyright 2013 VMware, Inc. (22 pages).

International Search Report & Written Opinion, PCT/US2015/067726, Mar. 17, 2016.

* cited by examiner

LIVE REPLICATION OF A VIRTUAL MACHINE EXPORTED AND IMPORTED VIA A PORTABLE STORAGE DEVICE

FIELD OF THE INVENTION

The various embodiments described herein relate to replicating one or more virtual machines and/or other workloads from one data center to another. In particular, the embodiments relate to replicating one or more workloads without significant interruption to the service(s) provided by the workloads.

BACKGROUND OF THE INVENTION

Enterprises seeking to migrate large volumes of workloads from one data center to another are faced with the challenges of the time it takes to replicate the data, the cost of bandwidth of transferring the data, and/or the interruption in service(s) provided by the migrated workloads. For example, an enterprise may wish to move hundreds or thousands of virtual machines from a private data center to a public cloud-based service. The transfer of 1,000 virtual machines corresponds to a transfer in the range of multiple terabytes of data. Transferring that amount of data over a network, even with a bandwidth of 155 megabits per second (Mbps) with reliable throughput, would take weeks and/or incur a significant interruption in the service(s) provided by those virtual machines. In addition to the large delay in transferring the data, that amount of bandwidth incurs a large financial cost. While some enterprises may have dedicated optical fiber connections between private data centers, an enterprise is unlikely to have a dedicated optical connection from a private data center to a public cloud-based service.

BRIEF DESCRIPTION OF THE DRAWINGS

The present invention is illustrated by way of example and is not limited to the figures of the accompanying drawings, in which like references indicate similar elements, and in which.

DETAILED DESCRIPTION

Embodiments described herein export virtual machine (VM) data to a locally-attached portable storage device within a source data center while the VM(s) continue to run. The portable storage device is physically transported to the destination data center, e.g., via a shipping or courier service. Once received, the VM data is imported within the destination data center. Leveraging the exported/imported VM data, the source and destination data centers execute a live replication of the VM(s) by transferring changed and/or remaining VM data to the destination data center until the VM data is within a threshold of similarity between the source and destination data centers. An indication that the virtual machine data within the destination data center is within a threshold of similarity with virtual machine data within the source data center is transmitted to the destination data center via the network connection. Once the VM data is within the threshold of similarity, the replication may be leveraged to execute the live migration of the VMs from the source data center to the destination data center, spin off a child VM from each of one or more of the VMs within the destination data center, or enable a fault tolerant copy of the VMs within the destination data center. For example, live migration of the VMs may include suspending execution of the VM(s) within the source data center once the VM data is within the threshold of similarity and resuming execution of the VM(s) within the destination data center. As a result, a large amount of virtual machine data can be quickly and inexpensively transferred to another data center with little to no perceptible interruption in the services provided by the corresponding workload(s). In some embodiments, the suspension of a VM is not required, since an exact replication may not be required. An example is one in which the purpose of the replication is to achieve high availability by maintaining the replication at the destination data center while the VM at the source data center is the primary VM. Thus, the replication may be instantiated but not needed for execution. Separately, the "threshold" may be set to zero, if the changed/remaining data can be transferred in totality while the original VM continues to execute.

Figure 1:
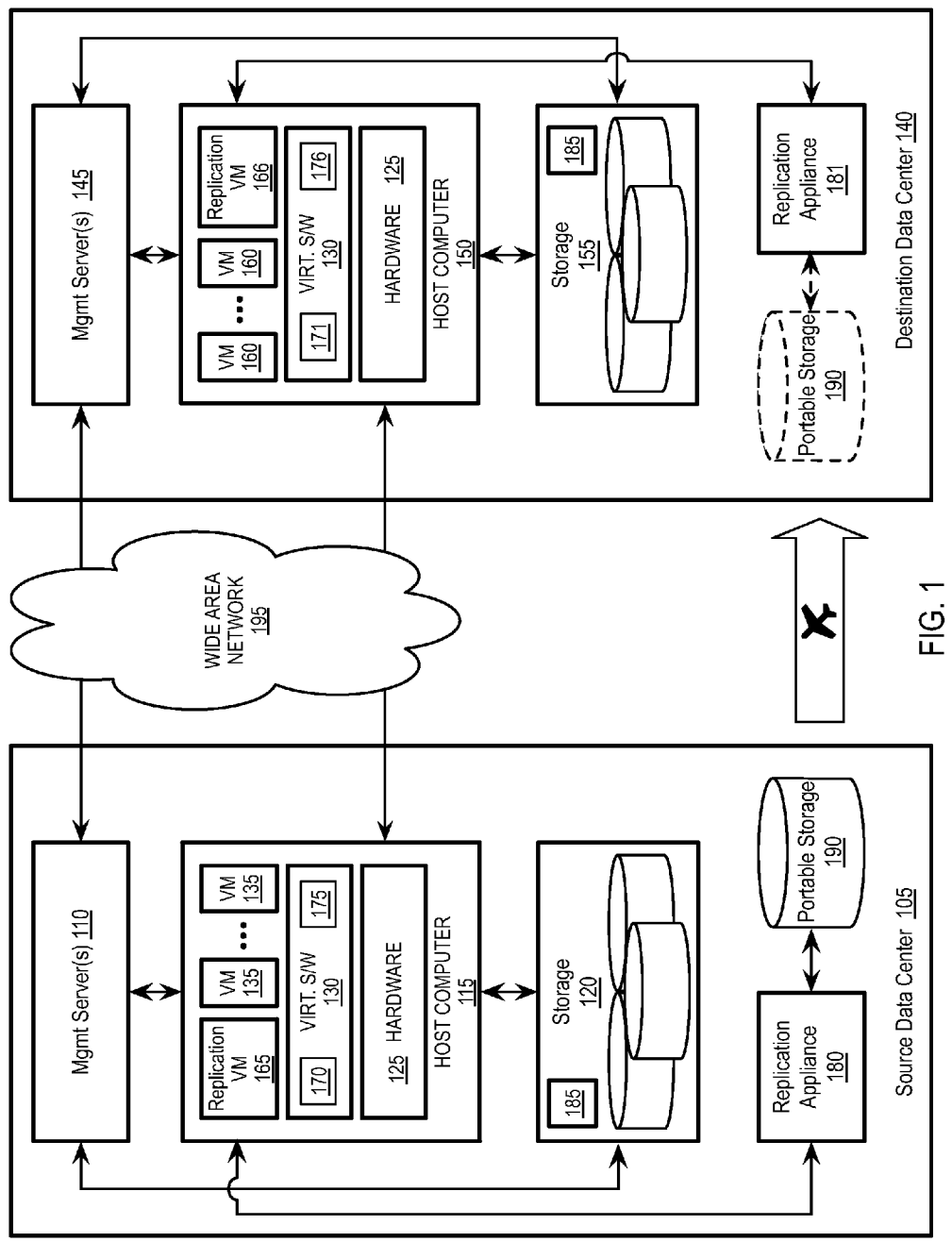
FIG. 1 illustrates two exemplary virtual data centers in block diagram form, each including one or more networked processing devices to implement live migration of a virtual machine exported and imported via a portable storage device.

FIG. 1 illustrates exemplary virtual data centers 105 and 140, each including one or more networked processing devices to implement live migration of a virtual machine exported and imported via a portable storage device. Source data center 105 includes management server(s) 110, one or more host computers 115, and storage 120. Each host computer 115 includes hardware 125, virtualization software layer 130 (also referred to as a hypervisor), and virtual machines (VMs) 135. Similarly, destination data center 140 includes management server(s) 145, one or more host computers 150, and storage 155. Each host computer 150 includes hardware 125, virtualization software layer 130, and VMs 160. In one embodiment, source data center 105 represents a first data center site and destination data center 140 represents a second, geographically distinct/remote data center site. For example, source data center 105 may be private data center on premises of an enterprise and destination data center 140 may be a public cloud service of which the enterprise is a customer.

VMs 135/160 are complete computation environments, containing virtual equivalents of the hardware and system software components of a physical system and are typically implemented by an extensive virtualization infrastructure, which includes a variety of software and hardware components. For example, one or more of the VMs may implement virtual desktops. A virtual desktop is a virtual computing system that operates as a desktop or workstation computer with which an end user can interact using a desktop remoting protocol over a network. In one embodiment, one or more of the VMs implement a virtualized compute, networking, storage, security service (e.g., a firewall, webserver, database server, etc.), or other workload.

Virtualization software layer 130 runs on hardware 125 of host computer 115/150 and manages one or more VMs 135/160. Virtualization software layer 130 manages physical resources, e.g., hardware 125, as well as maintains virtual-to-physical hardware mappings. For example, virtualization software 130 may manage VM access to a processor, memory, or network interface within hardware 125 as well as a virtual disk for each VM within underlying storage 120/155. In one embodiment, VMs 135 utilize portions of memory within hardware 125 for storing VM memory data while running on host computer 115.

Each of storage 120 and storage 155 includes one or more physical storage devices. In one embodiment, storage 120 and storage 155 include storage controllers 185 to serve read and write requests and management commands/queries from host devices 115/150 and management servers 110/145. For example, storage 120 stores VM disk files upon which VMs 135 rely and storage 155 stores VM disk files upon which VMs 160 rely. In one embodiment, each of storage 120 and storage 155 is partitioned into logical units, volumes, virtual volumes, and/or disks (which are collectively referred to herein as logical storage devices) that are stored on one or more of the physical storage devices. Each logical storage device is identified by a device identifier, e.g., a logical unit number (LUN), volume identifier, etc. Each of storage 120 and storage 155 may include additional arrays, logical storage devices, or other partitions of storage.

Host computer 115 includes replication VM 165 and/or one or more replication modules 170 within virtualization software layer 130. Additionally, source data center 105 includes replication appliance 180. In one embodiment, replication appliance 180 includes a VM or program running on a computer within source data center 105, e.g., a laptop, desktop, or host computer 115, to implement the export of the VM disk data from storage 120. As described in further detail below, replication VM 165 and/or replication module 170 copy VM disk data corresponding to a VM 135 to portable storage device 190. In one embodiment, the VM disk data is copied to multiple portable storage devices 190, e.g., according to redundant array of independent disks (RAID) or a similar distributed storage format, to increase fault tolerance in the transport of the VM disk data on portable storage devices 190.

In one embodiment, replication module 170 is an agent or process run by virtualization software layer 130 or a part of virtualization software layer 130. Replication module 170 tracks or enables a virtual disk to track changes made after a point in time. For example, as described herein, replication module 170 enables a virtual disk to track changes following the export of the virtual disk as described herein.

In one embodiment, replication VM 165 attaches an instance of replication module 170 to each VM disk to be replicated. As a result, each instance of replication module 170 may be configured according to the particular interface (e.g., virtual Small Computer System Interface (vSCSI)) for the corresponding VM disk. In one embodiment, replication VM 165 and replication module 170 work cooperatively to export a copy of a VM disk to replication appliance 180. For example, while VM 135 is running, replication VM 165 requests the VM disk data corresponding to VM 135 from storage 120. The request and subsequent response from storage 120 are handled by replication module 170. Replication module 170 formats the VM disk data from storage 120 for transfer (e.g., by adding a replication or transfer protocol header) and passes the formatted copies of the VM disk data to replication VM 165. Replication VM 165 transmits the formatted VM disk data to replication appliance 180. Replication appliance 180 unpacks the VM disk data (e.g., by removing the header) and stores it on portable storage device 190.

In an alternate embodiment, replication VM 165 transmits the VM disk data directly to portable storage device 190. For example, the VM disk data may be copied to portable storage device 190 without a replication header or other formatting and without the corresponding intervention of replication module 170 packing the VM disk data or replication appliance 180 unpacking the VM disk data. In another embodiment, storage 120 copies the VM disk data directly to portable storage device 190, e.g., in response to commands from replication VM 165. In yet another embodiment, the VM disk data is copied to portable storage device 190 without unpacking/removing the header and the VM disk data is unpacked within the destination data center 140.

Host computer 150 includes replication VM 166 and replication appliance 181. Additionally, host computer 150 may include replication module 171. As described in further detail below, portable storage device 190 is physically detached from replication appliance 180 (or, more generally, from source data center 105) and transported to destination data center 140. Portable storage device 190 is then physically attached to replication appliance 181 (e.g., as illustrated by the broken line representation of portable storage device 190) or otherwise within destination data center 140. In one embodiment, replication appliance 181 includes a VM or program running on a computer within destination data center 140, e.g., a laptop, desktop, or host computer 150, to implement the import of the VM disk data copied from source data center 105. For example, replication appliance 181 utilizes a data transfer protocol, such as Network File Copy (NFC), to transfer the VM disk data from portable storage device 190 to replication VM 166. Replication VM 166 writes the VM disk data to storage 155. In an alternate embodiment, the VM disk data is transferred to replication module 171, which writes the VM disk data to storage 155. In another embodiment, replication VM 166 or replication module 171 imports the VM disk data directly from portable storage device 190. For example, the VM disk data is copied from portable storage device 190 without replication appliance 181 in the data transmission path.

Virtualization software layer 130 further includes migration module 175 within source data center 105 and migration module 176 within destination data center 140. Migration modules 175 and 176 perform the live migration of one or more VMs 135 from source data center 105 to destination data center 140 following the respective export and import of corresponding VM disk data. For example, migration module 175 may configure or perform mirroring of write commands directed to VM disk files that have been exported from storage 120. As used herein, mirroring of write commands includes intercepting a write command directed to a virtual disk within underlying storage, creating a copy of the write command, and transmitting the copy of the write command to another destination while the intercepted write command proceeds to the intended virtual disk. For example, a mirrored write command may be transmitted to another host, cluster, or datacenter where the virtual disk will be migrated. The mirroring may be performed as a synchronous process (the write command is not acknowledged until both the original and mirrored copy of the write command are written to their respective targets) or asynchronous process (the write command is acknowledged when the original copy is written to its target). The mirrored copies of the write commands are transmitted, e.g., via network 195, to migration module 176. Additionally, migration module 175 may determine any VM data that has changed or was not otherwise included in the export, including VM disk data and VM memory data, and transmit the VM data to migration module 176. Migration module 176 utilizes the received mirrored copies of write commands and VM data to bring the imported copy of VM disk data up to date for the live migration. Migration module 175 may further determine when the amount of different and/or remaining VM data is within a threshold amount to migrate the VM(s) 135 to destination data center 140. Within this threshold, migration module 175 suspends execution of the VM(s) 135 within source data center 105 and transmits any remaining VM data and VM processor state data to migration module 176. Migration module 176 utilizes the received VM data and VM processor state data along with the imported VM disk data and the previously received VM data to resume execution of the VM(s) 135 within destination data center 140.

In one embodiment, management server(s) 110 provide a management console for manual and automated control of hosts 115, VMs 135, and storage 120. Similarly, data center manager B 170 provides a management console for manual and automated control of hosts 150, VMs 160, and storage 155. For example, management server(s) 110 and management server(s) 145 provision, configure, and maintain VMs as virtual desktops or network services, manage pools of computer resources to run the VMs, etc. In one embodiment, management server(s) 110 and management server(s) 145 assist in the migration of VMs between the data centers. For example, management server(s) 110 may transmit an indication to management server(s) 145 of a migration of VM(s) 135 from source data center 105 to destination data center 140. In response to the received indication, management server(s) 145 may provision and/or otherwise configure host computer 150 and/or storage 155 to receive one or more of the imported VM disk data from portable storage device 190, receive VM data (VM disk/memory/processor state data) from host computer 115 via network 195, receive the indication of the suspension of VM(s) 135 to be migrated, etc. Additionally, management server(s) 110 may receive an indication of resumed execution of VM(s) 135 after migration to destination data center 140 and terminate the VM(s) 135 within source data center 105.

Components of source data center 105 are coupled to components of destination data center 140 via wide area network 195. For example, wide area network 195 may include a series of routers between source data center 105 and destination data center 140 that facilitate the coupling of the various components.

Figure 2:
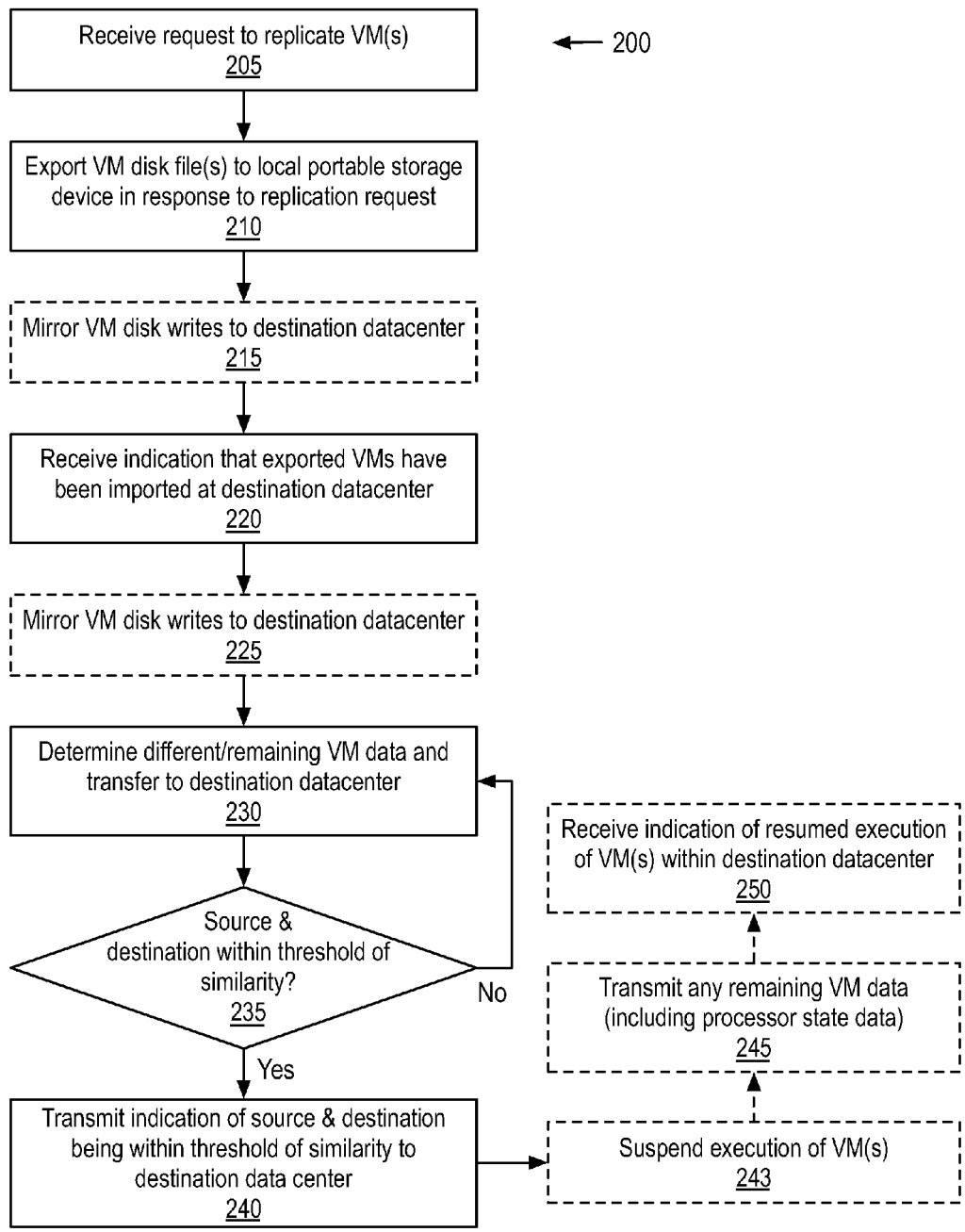
FIG. 2 is a flow chart illustrating an exemplary method of one or more networked processing devices within a source data center implementing live migration of a virtual machine exported and imported via a portable storage device.

FIG. 2 is a flow chart illustrating exemplary method 200 of one or more networked processing devices within source data center 105 implementing live migration of one or more VMs exported and imported via portable storage device 190. At block 205, host computer 115 receives a request to replicate one or more VM disks. For example, replication appliance 180 may initiate the replication by transmitting the request to replication VM 165. Alternatively, an administrator may utilize management server 110, a VM 135, replication VM 165, or another computer/virtual machine connected to source data center 105 to initiate the replication. In one embodiment, the replication request includes an indication of one or more VMs 135 to be replicated/migrated.

At block 210, host computer 115 exports the VM disk data to locally-attached portable storage device(s) 190. For example, replication VM 165 attaches replication module 170 to a VM disk file to be exported. Replication VM 165 transmits a read request for the VM disk file to storage 120.

In one embodiment, replication module 170 formats the VM disk data returned from storage 120 by adding a replication header or other data transfer header and returns the formatted VM disk data to replication VM 165. Replication VM 165 transmits the returned VM disk data to replication appliance 180. In one embodiment, replication appliance 180 unpacks the VM disk data by removing any header information added by replication module 170. Replication appliance 180 writes the VM disk data as a copy of the VM disk file on portable storage device 190.

In one embodiment, the export of VM disk data occurs while the corresponding VM(s) 135 are running on host computer 115 (but it should be noted that not all embodiments involve continued running of the VMs while the VM disk data is exported to the portable storage device 190). As a result, a VM 135 may issue write commands to change the underlying VM disk data while the VM disk data is being exported. To maintain consistency between the original and copied VM disk, replication module 170 tracks (e.g., using a bitmap or other data structure) each portion of the VM disk that has been copied and subsequent changes to the corresponding portion(s) of the VM disk. In one embodiment, subsequent changes/write commands are mirrored or otherwise transmitted to destination data center 140 as described below. Alternatively, replication VM 165 transmits one or more of the tracked changes to replication appliance 180 to update the copy of the VM disk stored on portable storage device 190 prior to the transport of portable storage device 190 to destination data center 140.

At block 215, host computer 115 optionally mirrors write commands directed to the copied VM disk file(s) (or portions thereof) in response to exporting the VM disk file(s) (or portions thereof). The mirrored write commands are transmitted via network 195 to destination data center 140 in anticipation of the import of the VM disk files from portable storage device 190 within destination data center 140. For example, in response to exporting a VM disk file to replication appliance 180/portable storage device 190 and configuration of the migration of one or more VMs 135, replication VM 165 transmits an indication to destination data center 140 (e.g., directly between the host computers 115/150 or via communication between management server 110 and management server 145) that the one or more VMs 135 are to be migrated from host computer(s) 115 to host computer(s) 150. In response to the received indication, management server 145 or host computer(s) 150 configure, via migration module 176, attached memory or storage to receive and store mirrored write commands received from host computer 115 until the VM disk file(s) are imported. Migration module 176 receives the mirrored write commands and buffers or otherwise temporarily stores the mirrored write commands in attached memory or storage. Once the VM disk files are imported within destination data center 140, migration module 176 may apply the mirrored write commands received, e.g., after the export to and before the import from the portable storage device 190.

At block 220, host computer 115 receives an indication of the VM disk files being imported within destination data center 140. For example, portable storage device 190 is physically detached from replication appliance 180 (or, more generally, from source data center 105) and transported to destination data center 140. The portable storage device 190 may be shipped via mail or courier service or simply carried by an administrator or other person from source data center 105 to destination data center 140. Given the cost of network bandwidth and time for transferring a large amount of VM disk data over a network, it is likely less expensive and faster to physically transport a large quantity of VM disk data via portable storage device 190 than to transmit the VM disk data over wide area network 195. Once portable storage device 190 is attached locally within destination data center 140, the VM disk data is imported, e.g., as described above and with reference to FIG. 3.

At block 225, host computer 115 optionally mirrors write commands directed to the copied VM disk file(s) in response to receiving the indication of the VM disk file(s) being imported within destination data center 140. For example, host computer 115 mirrors write commands received after the export of the VM disk files or after receiving the indication of the import of the VM disk files and transmits the mirrored write commands to host computer 150 over wide area network 195.

At block 230, host computer 115 determines what VM data is different from the previously exported or mirrored VM disk data or otherwise remains to be transferred to destination data center 140. Given the export of VM disk data from storage 120 to portable storage device 190 and corresponding import of the VM disk data within destination data center 140, only VM data that has changed, was not exported to portable storage device 190, or otherwise has yet to be transmitted to destination data center 140 needs to be transmitted to execute the live migration of VM(s) 135. Once determined, host computer 115 transfers the different/remaining VM data to host computer 150. For example, replication module 170 mirrors or otherwise tracks (e.g., using a bitmap or other data structure) changes to VM disk file(s) subsequent to the export of those VM disk file(s) or corresponding portions thereof. In response to receiving the indication of VM disk data import within destination data center 140, migration module 175 or replication VM 165 queries replication module 170 for the VM data that has yet to be transferred to destination data center 140 and transmits the VM data to host computer 150. In one embodiment, the remaining VM data includes VM memory data. In one embodiment, only the different/remaining VM data is transmitted to host computer 150—i.e., the VM disk data exported to and imported from portable storage device 190 is omitted from VM data transmitted via wide area network 195.

At block 235, host computer 115 determines if the source and destination copies of the VM data are within a threshold of similarity. For example, the corresponding VMs 135 continue to run during the determination and transfer of remaining VM data. As a result, a VM 135 may issue write commands or otherwise change VM data during or after the (no longer current) VM data is transferred from data center 105 to data center 140 via portable storage device 190. In one embodiment, the threshold is defined by an amount of storage space. If the different/remaining VM data consumes more than the threshold amount of storage space, method 200 returns to block 230 to continue determining and transferring different/remaining VM data until the difference between the source and destination copies of VM data are within the threshold. One embodiment for implementing this threshold-driven approach is described in U.S. Pat. No. 8,554,900 to Nelson, which provides iterative memory transfers until a threshold is reached (referred to as "vMotion"). Alternatively or additionally, the processing described in U.S. Pat. No. 8,239,646 to Colbert et al. may be used, such that changes made after copying the source/original VM disk are redirected to a child VM disk until the destination data center is ready to transfer the data from the child VM disk. Once transferred, the changed data from the child VM disk is then consolidated with the copied data at the destination data center. In accordance with this approach of Colbert et al., an additional child VM disk may be created for redirected changes being made while the first child VM disk is being transferred, so that the data from the additional child VM disk is available for subsequent transfer (and then consolidation) to the destination data center.

If migration module 175 determines the different/remaining VM data consumes less than the threshold amount of storage space, at block 240, host computer 115 transmits an indication to the destination data center 140 that the source and destination copies of the VM data are within the threshold of similarity. Once the VM data is within the threshold of similarity, the replication may be leveraged to execute the live migration of the VMs 135 from source data center 105 to the destination data center 140, spin off a child VM 160 within the destination data center 140 from each of one or more of the VMs 135, or enable a fault tolerant copy of VMs 135 within destination data center 140.

At block 243, host computer 115 optionally suspends execution of the VM(s) to be migrated to destination data center 140. For example, migration module 175 alerts management server 110 that the VM(s) 135 are ready for migration. In response to the alert, management server 110 suspends execution of the VM(s) 135.

At block 245, host computer 115 optionally transmits any remaining VM data to host computer 150. For example, any different/remaining VM disk data that was within the threshold amount, VM memory data that had not been flushed to the corresponding VM disk file, and VM processor state data are copied and transferred to host computer(s) 150 to enable host computer(s) 150 to resume execution of VM(s) 135 within destination data center 140. Exemplary processor state data includes the contents of an exception flags register, general purpose registers, segment registers, instruction pointer register, local descriptor table register, task register, debug registers, control registers, interrupt descriptor table register, global descriptor table register, floating point state, etc.

At block 250, host computer 115 optionally receives indication of resumed execution of migrated VM(s) 135 within destination data center 140. For example, once execution of VM(s) 135 resumes within destination data center 140, migration module 176 transmits the indication to migration module 175. In one embodiment, migration module 175 alerts management server 110 of the resumed execution of VM(s) 135 within destination data center. Alternatively, management server 145 transmits the indication to management server 110. In response to the indication, management server 110 instructs host computer 115 to terminate the suspended VM(s) 135 within source data center 105 or otherwise release the resources used by the migrated VM(s).

Figure 3:
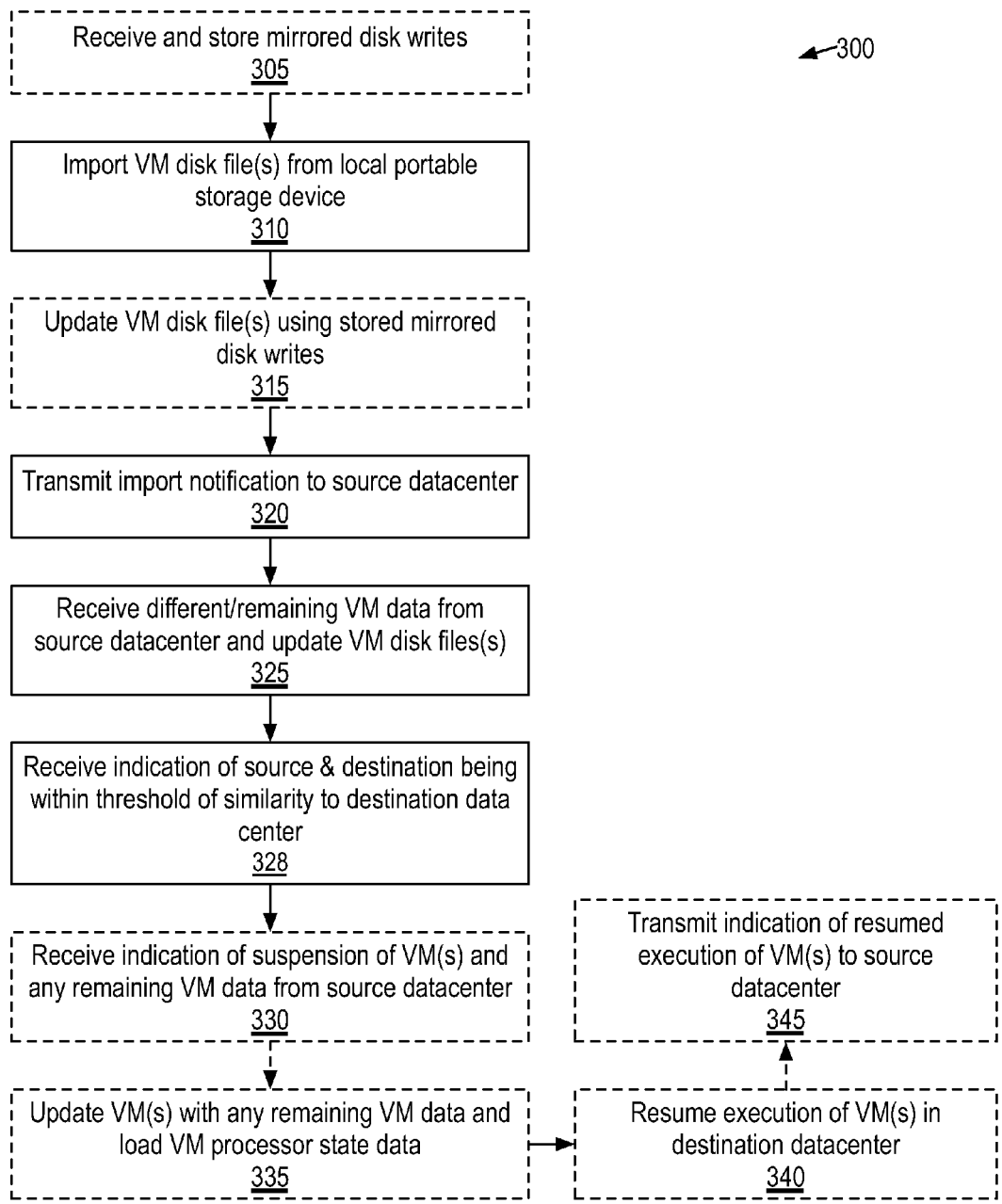
FIG. 3 is a flow chart illustrating an exemplary method of one or more networked processing devices within a destination data center implementing live migration of a virtual machine exported and imported via a portable storage device.

Alternatively, host computer 115 resumes execution of VM(s) 135 within source data center 105. For example, method 200 may be used to FIG. 3 is a flow chart illustrating exemplary method 300 of one or more networked processing devices within destination data center 140 implementing live migration of VM(s) exported and imported via a portable storage device 190. At block 305, host computer 150 optionally receives and stores mirrored VM disk write commands received from host computer 115 (e.g., as described with reference to block 215 above). For example, management server 145 may configure host computer 150 to provision or reserve resources for the migration of VM(s) 135 or otherwise alert host computer of the migration of VM(s) 135 from host computer 115. In anticipation of the import of the VM disk data from portable storage device 190, host computer 150 saves the mirrored write commands. Alternatively, host computer 150 determines from the received mirrored write commands that VM(s) 135 have yet to be migrated or have corresponding VM disk files imported within destination data center 140 and saves the mirrored write commands in anticipation of the import of the VM disk data. For example, each received mirrored write command may include an indication of the VM disk file intended to be written. If an indicated VM disk file has yet to be imported, migration module 176 stores the mirrored write command(s) until the VM disk file has been imported.

At block 310, host computer 150 imports the VM disk data from portable storage device 190. As described above, portable storage device 190 is physically detached from replication appliance 180 (or, more generally, from source data center 105) and transported to destination data center 140. Once portable storage device 190 is attached locally within destination data center 140, e.g., to replication appliance 181, the VM disk data stored on portable storage device is imported. In one embodiment, an administrator initiates the import using replication appliance 181 by selecting the VM disk data to be imported and the destination of the import, e.g., host computer 150. In one embodiment, replication appliance 181 utilizes a data transfer protocol (e.g., NFC) to transfer the VM disk data from portable storage device 190 to replication VM 166. Replication VM 166 writes the VM disk data to storage 155.

At block 315, host computer 150 optionally updates the imported VM disk data with any mirrored write commands received and stored prior to or during the import. For example, migration module 176 retrieves mirrored write commands in the order in which they were received and transmits them to storage 155 to bring the imported VM disk data into closer consistency with the current state of corresponding VM disk data within source data center 105.

At block 320, host computer 150 transmits a notification of the import to source data center 105. For example, replication VM 166 transmits the notification to host computer 115. Alternatively, replication VM 166 notifies management server 145 that the import of the VM disk data is complete and management server 145 transmits the notification to management server 110 within source data center and management server 110 notifies host computer 115 (e.g., migration module 175).

At block 325, host computer 150 receives mirrored disk writes (e.g., as described with reference to block 225) and/or any remaining/different VM data (e.g., as described with reference to block 230) and updates the imported VM disk data. For example, migration module 176 transmits the mirrored write commands and/or VM disk data changes in the order in which they were received to storage 155 to bring the imported VM disk data into closer consistency with the current state of corresponding VM disk data within source data center 105. In one embodiment, host computer 150 further loads received VM memory data in the memory of host computer 150. As described with reference to block 235, this may be an iterative process.

At block 328, host computer 150 receives an indication that the source and destination copies of the VM data are within the threshold of similarity. Once the VM data is within the threshold of similarity, the replication may be leveraged to execute the live migration of the VMs 135 from source data center 105 to the destination data center 140, spin off a child VM 160 within the destination data center 140 from each of one or more of the VMs 135, or enable a fault tolerant copy of VMs 135 within destination data center 140. For example, blocks 330-345 illustrate an example of migrating VMs 135 from source data center 105 to the destination data center 140.

At block 330, host computer 150 optionally receives an indication of the suspension of VM(s) within source data center 105 (e.g., as described with reference to block 240) and any remaining VM data from host computer 115 (e.g., as described with reference to block 245). For example, migration module 176 receives the indication and final VM data to execute the live migration of VM(s) 135.

At block 335, host computer 150 optionally updates the imported VM disk data with the final VM data and loads the VM processor state data. In one embodiment, host computer 150 further updates the memory of host computer 150 with received VM memory data. For example, migration module 176 utilizes the final different/remaining VM disk data, VM memory data that had not been flushed to the corresponding VM disk file, and VM processor state data received from host computer 115.

At block 340, host computer 150 optionally resumes execution of VM(s) 135 within destination data center 140. For example, host computer 150 uses the copy of the VM disk data imported from portable storage device 190 to storage 155 and the other received VM data to resume the execution of VM 135 within destination data center 140 at the point of operation at which VM 135 was suspended within source data center 105.

At block 345, host computer 150 optionally transmits an indication of the resumed execution of VM(s) 135 to source data center 105, e.g., as described with reference to block 250.

Figure 4:
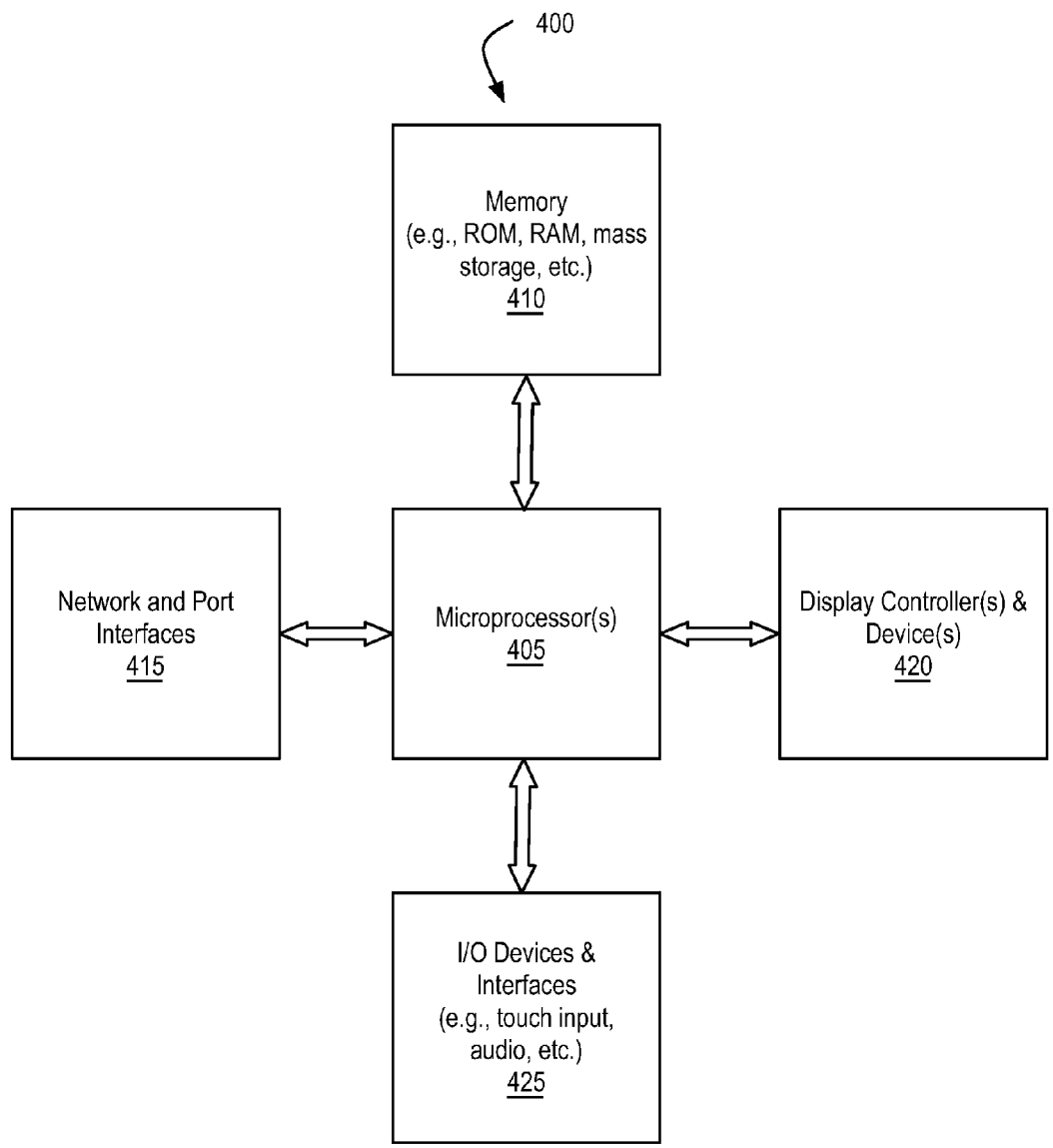
FIG. 4 illustrates, in block diagram form, an exemplary processing system to implement live migration of a virtual machine exported and imported via a portable storage device.

FIG. 4 illustrates, in block diagram form, an exemplary processing system to implement live migration of a virtual machine exported and imported via a portable storage device. Data processing system 400 includes one or more microprocessors 405 and connected system components (e.g., multiple connected chips). Alternatively, data processing system 400 is a system on a chip.

Data processing system 400 includes memory 410, which is coupled to microprocessor(s) 405. Memory 410 may be used for storing data, metadata, and programs for execution by the microprocessor(s) 405. Memory 410 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 410 may be internal or distributed memory.

Data processing system 400 includes network and port interfaces 415, such as a port, connector for a dock, or a connector for a USB interface, FireWire, Thunderbolt, Ethernet, Fibre Channel, etc. to connect the system 400 with another device, external component, or a network. Exemplary network and port interfaces 415 also include wireless transceivers, such as an IEEE 802.11 transceiver, an infrared transceiver, a Bluetooth transceiver, a wireless cellular telephony transceiver (e.g., 2G, 3G, 4G, etc.), or another wireless protocol to connect data processing system 400 with another device, external component, or a network and receive stored instructions, data, tokens, etc.

Data processing system 400 also includes display controller and display device 420 and one or more input or output ("I/O") devices and interfaces 425. Display controller and display device 420 provides a visual user interface for the user. I/O devices 425 allow a user to provide input to, receive output from, and otherwise transfer data to and from the system. I/O devices 425 may include a mouse, keypad or a keyboard, a touch panel or a multi-touch input panel, camera, optical scanner, audio input/output (e.g., microphone and/or a speaker), other known I/O devices or a combination of such I/O devices.

It will be appreciated that one or more buses, may be used to interconnect the various components shown in FIG. 4.

Data processing system 400 is an exemplary representation of one or more of management servers 110 and 145, host computers 115, storage devices 120 and 155, replication appliances 180 and 181, and portable storage device(s) 190 described above. Data processing system 400 may be a personal computer, tablet-style device, a personal digital assistant (PDA), a cellular telephone with PDA-like functionality, a Wi-Fi based telephone, a handheld computer which includes a cellular telephone, a media player, an entertainment system, or devices which combine aspects or functions of these devices, such as a media player combined with a PDA and a cellular telephone in one device. In other embodiments, data processing system 400 may be a network computer, server, or an embedded processing device within another device or consumer electronic product. As used herein, the terms computer, device, system, processing system, processing device, and "apparatus comprising a processing device" may be used interchangeably with data processing system 400 and include the above-listed exemplary embodiments.

It will be appreciated that additional components, not shown, may also be part of data processing system 400, and, in certain embodiments, fewer components than that shown in FIG. 4 may also be used in data processing system 400. It will be apparent from this description that aspects of the inventions may be embodied, at least in part, in software. That is, the computer-implemented methods 200 and 300 may be carried out in a computer system or other data processing system 400 in response to its processor or processing system 405 executing sequences of instructions contained in a memory, such as memory 410 or other non-transitory machine-readable storage medium. The software may further be transmitted or received over a network (not shown) via network interface device 415. In various embodiments, hardwired circuitry may be used in combination with the software instructions to implement the present embodiments. Thus, the techniques are not limited to any specific combination of hardware circuitry and software, or to any particular source for the instructions executed by data processing system 400.

An article of manufacture may be used to store program code providing at least some of the functionality of the embodiments described above. Additionally, an article of manufacture may be used to store program code created using at least some of the functionality of the embodiments described above. An article of manufacture that stores program code may be embodied as, but is not limited to, one or more memories (e.g., one or more flash memories, random access memories—static, dynamic, or other), optical disks, CD-ROMs, DVD-ROMs, EPROMs, EEPROMs, magnetic or optical cards or other type of non-transitory machine-readable media suitable for storing electronic instructions. Additionally, embodiments of the invention may be implemented in, but not limited to, hardware or firmware utilizing an FPGA, ASIC, a processor, a computer, or a computer system including a network. Modules and components of hardware or software implementations can be divided or combined without significantly altering embodiments of the invention.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses distinct name spaces to isolate the containers from each other and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

It should be recognized that while the specification refers to VMs, the examples given could be any type of DCNs, including physical hosts, VMs, non-VM containers, and hypervisor kernel network interface modules. In fact, the example networks could include combinations of different types of DCNs in some embodiments.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. References in the specification to "one embodiment," "an embodiment," "an exemplary embodiment," etc., indicate that the embodiment described may include a particular feature, structure, or characteristic, but not every embodiment may necessarily include the particular feature, structure, or characteristic. Moreover, such phrases are not necessarily referring to the same embodiment. Furthermore, when a particular feature, structure, or characteristic is described in connection with an embodiment, such feature, structure, or characteristic may be implemented in connection with other embodiments whether or not explicitly described. Additionally, as used herein, the term "exemplary" refers to embodiments that serve as simply an example or illustration. The use of exemplary should not be construed as an indication of preferred examples. Blocks with dashed borders (e.g., large dashes, small dashes, dot-dash, dots) are used herein to illustrate optional operations that add additional features to embodiments of the invention. However, such notation should not be taken to mean that these are the only options or optional operations, and/or that blocks with solid borders are not optional in certain embodiments of the invention. Numerous specific details are described to provide a thorough understanding of various embodiments of the present invention. However, in certain instances, well-known or conventional details are not described in order to provide a concise discussion of embodiments of the present inventions.

It will be evident that various modifications may be made thereto without departing from the broader spirit and scope of the invention as set forth in the following claims. For example, the methods described herein may be performed with fewer or more features/blocks or the features/blocks may be performed in differing orders. Additionally, the methods described herein may be repeated or performed in parallel with one another or in parallel with different instances of the same or similar methods.

What is claimed is:

1. A computer-implemented method, comprising:
   receiving, by a host computer within a source data center, a request to initiate replication of a virtual machine running on the host computer, wherein virtual machine data for the virtual machine includes a virtual machine disk and a virtual machine memory stored within the source data center;
   exporting, in response to the request to initiate the replication of the virtual machine, a copy of the virtual machine disk to a portable storage device attached locally within the source data center while the virtual machine continues running on the host computer within the source data center, the portable storage device being configured to be detached from the source data center and physically transported to a destination data center;
   receiving an indication that the copy of the virtual machine disk has been imported from the portable storage device that was previously attached locally within the source data center and subsequently attached locally within the destination data center;
   determining virtual machine data within the source data center is different from or not included within the exported copy of the virtual machine disk in the portable storage device in response to the received indication;
   transmitting, to the destination data center via a network connection while the virtual machine continues running on the host computer within the source data center, the virtual machine data determined to be different from or not included within the copy of the virtual machine disk exported to the portable storage device;
   determining virtual machine data within the destination data center is within a threshold of similarity with virtual machine data within the source data center; and
   transmitting, to the destination data center via the network connection, an indication that the virtual machine data within the destination data center is within a threshold of similarity with virtual machine data within the source data center.

2. The computer-implemented method of claim 1, further comprising:
   tracking changes to the virtual machine disk as the changes occur following the export, wherein the host computer utilizes the tracked changes to determine which virtual machine data within the source data center is different from or not included within the exported copy of the virtual machine disk.

3. The computer-implemented method of claim 1, further comprising:
   transmitting, to the destination data center via the network connection, mirrored copies of write requests directed to the virtual machine disk within the source data center.

4. The computer-implemented method of claim 3, wherein the host computer within the source data center initiates the transmission of the mirrored copies of write requests in response to the exporting of the copy of the virtual machine disk to the portable storage device that is physically transported to the destination data center.

5. The computer-implemented method of claim 1, wherein the virtual machine data determined to be different from or not included within the copy of the virtual machine disk exported to the portable storage device includes data from the virtual machine memory within the source data center.

6. The computer-implemented method of claim 1, wherein the network connection is a wide area network connection.

7. The computer-implemented method of claim 1, further comprising:
   suspending execution of the virtual machine within the source data center; and
   receiving indication of the virtual machine resuming execution on a host computer within the destination data center, the virtual machine resumed on the host computer within the destination data center using the imported copy of the virtual machine disk data and the transmitted virtual machine data.

8. The computer-implemented method of claim 7, further comprising:
   transmitting virtual machine processor state data to the destination data center during the suspension of execution of the virtual machine within the source data center.

9. A non-transitory computer-readable medium storing instructions, which when executed by a processing device, cause the processing device to perform a method comprising:
   receiving, by a host computer within a source data center, a request to initiate replication of a virtual machine running on the host computer, wherein virtual machine data for the virtual machine includes a virtual machine disk and a virtual machine memory stored within the source data center;
   exporting, in response to the request to initiate the replication of the virtual machine, a copy of the virtual machine disk to a portable storage device attached locally within the source data center while the virtual machine continues running on the host computer within the source data center, the portable storage device being configured to be detached from the source data center and physically transported to a destination data center;
   receiving an indication that the copy of the virtual machine disk has been imported from the portable storage device that was previously attached locally within the source data center and subsequently attached locally within the destination data center;
   determining virtual machine data within the source data center is different from or not included within the exported copy of the virtual machine disk in the portable storage device in response to the received indication;
   transmitting, to the destination data center via a network connection while the virtual machine continues running on the host computer within the source data center, the virtual machine data determined to be different from or not included within the copy of the virtual machine disk exported to the portable storage device;
   determining virtual machine data within the destination data center is within a threshold of similarity with virtual machine data within the source data center;
   transmitting, to the destination data center via the network connection, an indication that the virtual machine data within the destination data center is within a threshold of similarity with virtual machine data within the source data center.

10. The non-transitory computer-readable medium of claim 9, the method further comprising:
tracking changes to the virtual machine disk as the changes occur following the export, wherein the host computer utilizes the tracked changes to determine which virtual machine data within the source data center is different from or not included within the exported copy of the virtual machine disk.

11. The non-transitory computer-readable medium of claim 9, the method further comprising:
transmitting, to the destination data center via the network connection, mirrored copies of write requests directed to the virtual machine disk within the source data center.

12. The non-transitory computer-readable medium of claim 11, wherein the host computer within the source data center initiates the transmission of the mirrored copies of write requests in response to the exporting of the copy of the virtual machine disk to the portable storage device that is physically transported to the destination data center.

13. The non-transitory computer-readable medium of claim 9, wherein the virtual machine data determined to be different from or not included within the copy of the virtual machine disk exported to the portable storage device includes data from the virtual machine memory within the source data center.

14. The non-transitory computer-readable medium of claim 9, wherein the network connection is a wide area network connection.

15. The non-transitory computer-readable medium of claim 9, the method further comprising:
suspending execution of the virtual machine within the source data center; and
receiving indication of the virtual machine resuming execution on a host computer within the destination data center, the virtual machine resumed on the host computer within the destination data center using the imported copy of the virtual machine disk data and the transmitted virtual machine data.

16. The non-transitory computer-readable medium of claim 15, the method further comprising: transmitting virtual machine processor state data to the destination data center during the suspension of execution of the virtual machine within the source data center.

17. A host computer within a source data center comprising:
a processing device; and
a memory coupled to the processing device, the memory storing instructions which, when executed by the processing device, cause the host computer to:
receive a request to initiate replication of a virtual machine running on the host computer, wherein virtual machine data for the virtual machine includes a virtual machine disk and a virtual machine memory stored within the source data center;
export, in response to the request to initiate the replication of the virtual machine, a copy of the virtual machine disk to a portable storage device attached locally within the source data center while the virtual machine continues running on the host computer within the source data center, the portable storage device being configured to be detached from the source data center and physically transported to a destination data center;
receive an indication that the copy of the virtual machine disk has been imported from the portable storage device that was previously attached locally within the source data center and subsequently attached locally within the destination data center;
determine virtual machine data within the source data center is different from or not included within the exported copy of the virtual machine disk in the portable storage device in response to the received indication;
transmit, to the destination data center via a network connection while the virtual machine continues running on the host computer within the source data center, the virtual machine data determined to be different from or not included within the copy of the virtual machine disk exported to the portable storage device;
determine virtual machine data within the destination data center is within a threshold of similarity with virtual machine data within the source data center; and
transmit, to the destination data center via the network connection, an indication that the virtual machine data within the destination data center is within a threshold of similarity with virtual machine data within the source data center.

18. The host computer of claim 17, wherein the instructions further cause the host computer to:
tracking changes to the virtual machine disk as the changes occur following the export, wherein the host computer utilizes the tracked changes to determine which virtual machine data within the source data center is different from or not included within the exported copy of the virtual machine disk.

19. The host computer of claim 17, wherein the instructions further cause the host computer to: transmitting, to the destination data center via the network connection, mirrored copies of write requests directed to the virtual machine disk within the source data center.

20. The host computer of claim 19, wherein the host computer within the source data center initiates the transmission of the mirrored copies of write requests in response to the exporting of the copy of the virtual machine disk to the portable storage device that is physically transported to the destination data center.

* * * * *